United States Patent
Hewavithana et al.

(10) Patent No.: US 8,275,057 B2
(45) Date of Patent: Sep. 25, 2012

(54) METHODS AND SYSTEMS TO ESTIMATE CHANNEL FREQUENCY RESPONSE IN MULTI-CARRIER SIGNALS

(75) Inventors: Thushara Hewavithana, Borehamwood (LK); Bernard Arambepola, Enfield (GB); Parveen K. Shukla, Nottingham (GB)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 12/339,387

(22) Filed: Dec. 19, 2008

(65) Prior Publication Data

US 2010/0158141 A1 Jun. 24, 2010

(51) Int. Cl.
*H04K 1/10* (2006.01)
(52) U.S. Cl. ........ 375/260; 375/316; 375/264; 370/204; 370/208; 370/210
(58) Field of Classification Search .................... 375/260
See application file for complete search history.

(56) References Cited

U.S. PATENT DOCUMENTS

| | | | |
|---|---|---|---|
| 7,724,637 B2 * | 5/2010 | Gardner | 370/204 |
| 7,801,020 B2 | 9/2010 | Shukla et al. | |
| 7,970,068 B2 | 6/2011 | Arambepola et al. | |
| 2003/0215011 A1 * | 11/2003 | Wang et al. | 375/240.03 |
| 2004/0192218 A1 * | 9/2004 | Oprea | 455/73 |
| 2006/0001573 A1 * | 1/2006 | Kim et al. | 343/702 |
| 2006/0203932 A1 * | 9/2006 | Palanki et al. | 375/295 |
| 2007/0280367 A1 | 12/2007 | Nakao et al. | |
| 2009/0059961 A1 | 3/2009 | Shukla et al. | |
| 2009/0135923 A1 | 5/2009 | Arambepola et al. | |

FOREIGN PATENT DOCUMENTS

| | | |
|---|---|---|
| DE | 10 2006 056158 A1 | 6/2008 |
| JP | 2007-013310 A | 1/2007 |
| JP | 2007-074351 A | 3/2007 |
| JP | 2007-324813 A | 12/2007 |
| JP | 2008-167088 A | 7/2008 |
| WO | 2008/1058087 A2 | 5/2008 |

OTHER PUBLICATIONS

Office Action Received for Japanese Patent Application No. 2009-283671, mailed on Apr. 10, 2012, 2 pages of Office Action and 2 pages of English Translation.
Haifang, et al., "An Efficient Iterative DFT-Based Channel Estimation for MIMO-OFDM Systems on Multipath Channels", Communications and networking in China, Chinacom, Third international conference on Aug. 25-27, 2008, 5 pages.
Tsai, et al., "Frequency-Domain Interpolation-Based Channel Estimation in Pilot-Aided OFDM Systems", Proceedings IEEE 59th Vehicular Technology Conference, 0-7803-8255-2/04/IEEE, May 2004, pp. 420-424.
Extended European Search Report received for European Patent Application No. 09180238.9, mailed on May 7, 2012, 4 pages.

* cited by examiner

*Primary Examiner* — Lihong Yu
(74) *Attorney, Agent, or Firm* — Garrett IP, LLC (57) ABSTRACT

Methods and systems to determine channel frequency responses corresponding to multi-carrier signals, such as OFDM signals, including to filter or mask noise from channel frequency response estimates in a time domain.

18 Claims, 10 Drawing Sheets

METHODS AND SYSTEMS TO ESTIMATE CHANNEL FREQUENCY RESPONSE IN MULTI-CARRIER SIGNALS

BACKGROUND

Estimating channel frequency responses corresponding to orthogonal frequency division multiplexed (OFDM) signals may include estimating channel frequency responses corresponding to scattered pilots within the OFDM signal, interpolating the scattered pilot channel frequency responses over multiple symbols of the OFDM signal to obtain channel frequency responses corresponding to non-pilot positions of scattered pilot frequencies, and frequency interpolating the estimated channel frequency responses corresponding to the scattered pilot frequencies of a symbol, to obtain channel frequency responses corresponding to non-scattered pilot frequencies of the symbol.

Under noisy channel conditions, such as in a digital terrestrial television broadcast environment, OFDM pilots may be impacted with additive noise. In mobile applications, pilots may also be impacted by inter-carrier interference (ICI). Such impacts may degrade a signal-to-noise ratio (SNR) of channel frequency response estimates.

For stationary applications, noise may be filtered during the initial interpolation using a relatively narrow bandwidth filter, but at relatively substantial cost in terms of memory and hardware complexity. For mobile applications, using a relatively narrow bandwidth filter in the initial interpolation may result in loss of Doppler spectrum.

For low delay spread signals, noise may be filtered during the subsequent frequency interpolation by using relatively narrowband filter. However, for single frequency networks (SFN) with large multipath delays, a narrowband filter may result in loss of multipath profile.

BRIEF DESCRIPTION OF THE DRAWINGS/FIGURES

In the drawings, the leftmost digit(s) of a reference number identifies the drawing in which the reference number first appears.

DETAILED DESCRIPTION

Figure 1:
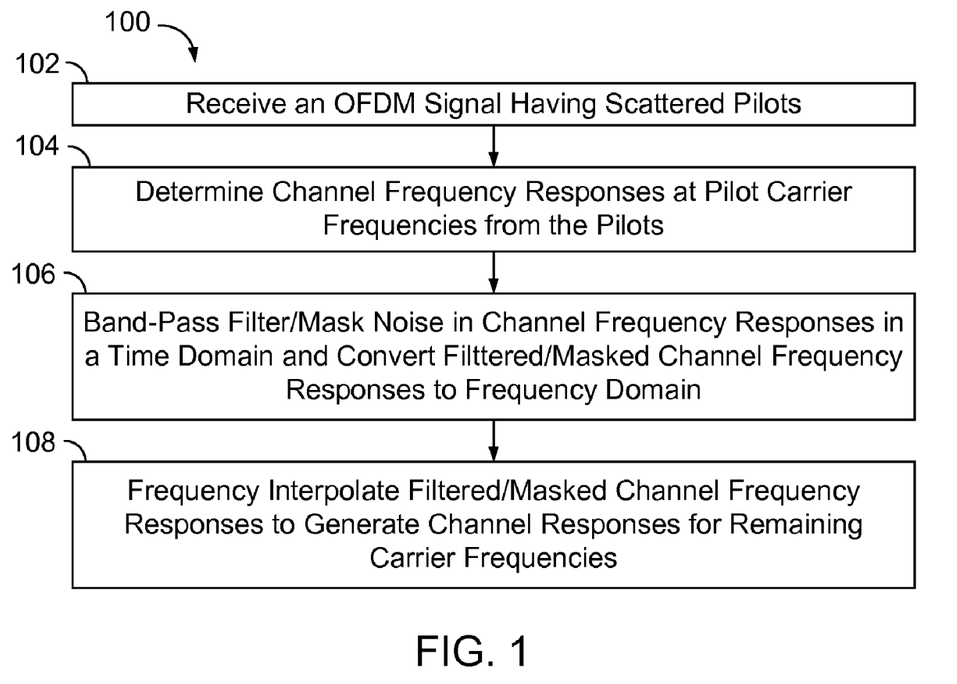
FIG. 1 is a process flowchart of an exemplary method of determining or estimating channel frequency response of a multi-carrier signal, such as an orthogonal frequency division multiplexed (OFDM) signal.

FIG. 1 is a process flowchart of an exemplary method 100 of determining or estimating channel frequency response of a multi-carrier signal, such as an orthogonal frequency division multiplexed (OFDM) signal. Method 100 is described below with reference to an OFDM signal. Method 100 is not, however, limited to OFDM signals. Method 100 is described below with reference to FIGS. 2-14. Method 100 is not, however, limited to the examples of FIGS. 2-14.

At 102, an OFDM signal having pilot signals or pilots is received. The pilots may include a tone and/or information, which may modulate a corresponding pilot carrier, such as with binary phase shift keying (BPSK) modulation. Pilot locations may have a repeating pattern, referred to herein as scattered pilots.

A single instance of the OFDM signal may be received from a single transmitter. Alternatively, a plurality of instances of the OFDM signal may be received from a plurality of corresponding transmitters, such as in a single-frequency network (SFN).

Figure 2:
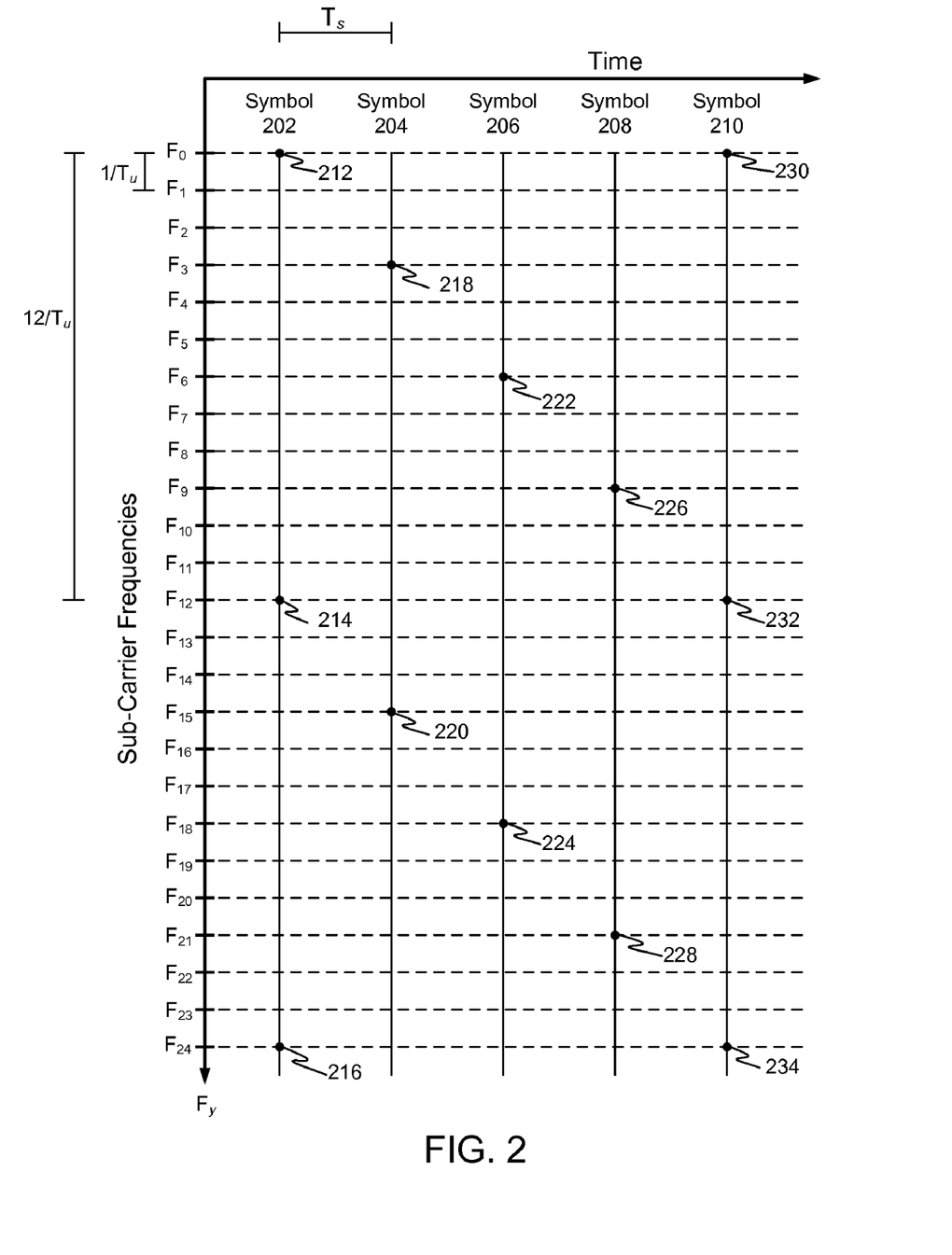
FIG. 2 is a graphic representation of a plurality of symbols of an OFDM signal.

FIG. 2 is a graphic representation of a plurality of exemplary symbols 202 through 210 of an OFDM signal. Each of symbols 202 through 210 includes a plurality of carrier signals at carrier frequencies $F_0$ through $F_j$. The number of carrier frequencies may range up into tens of thousands.

In the example of FIG. 2, symbol 202 includes pilots 212, 214, and 216 at frequencies $F_0$, $F_{12}$, and $F_{24}$, respectively. Symbol 204 includes pilots 218 and 220 at frequencies $F_3$ and $F_{15}$, respectively. Symbol 206 includes pilots 222 and 224 at frequencies $F_6$ and $F_{18}$, respectively. Symbol 208 includes pilots 226 and 228 at frequencies $F_9$ and $F_{21}$, respectively. Symbol 210 includes pilots 230, 232, and 234 at frequencies $F_0$, $F_{12}$, and $F_{24}$, respectively.

In the example of FIG. 2, the pilots occur at 12 frequency intervals within a symbol. The pilots are shifted by 3 frequencies in each subsequent symbol. Such a pattern may be found in one or more digital television broadcast standards such as DVB-T, DVB-H, ISDB-T, and DVB-T2. Other scattered pilot patterns may be implemented. An OFDM signal may include other types of pilots, including continuous pilots that occur at the same frequency or frequencies of multiple OFDM signals.

In the example of FIG. 2, the pilots are arbitrarily illustrated as starting at frequency $F_0$ of symbol 202. The pilots may begin at other frequencies of symbol 202.

Frequencies of pilot carriers are referred to herein as pilot frequencies. In the example of FIG. 2, pilot frequencies include $F_0$, $F_3$, $F_6$, $F_9$, $F_{12}$, $F_{15}$, $F_{18}$, $F_{21}$, and $F_{24}$.

Symbols 202 through 210 occur at a symbol period $T_s = T_u + T_g$, where $T_u$ is the useful or effective symbol duration and $T_g$ is the guard duration The ratio $T_g/T_u$ is defined as the guard ratio. Carrier frequencies $F_0$ through $F_y$ may be separated by $1/T_u$, and the pilots within a symbol may be spaced by $12/T_u$.

Figure 3:
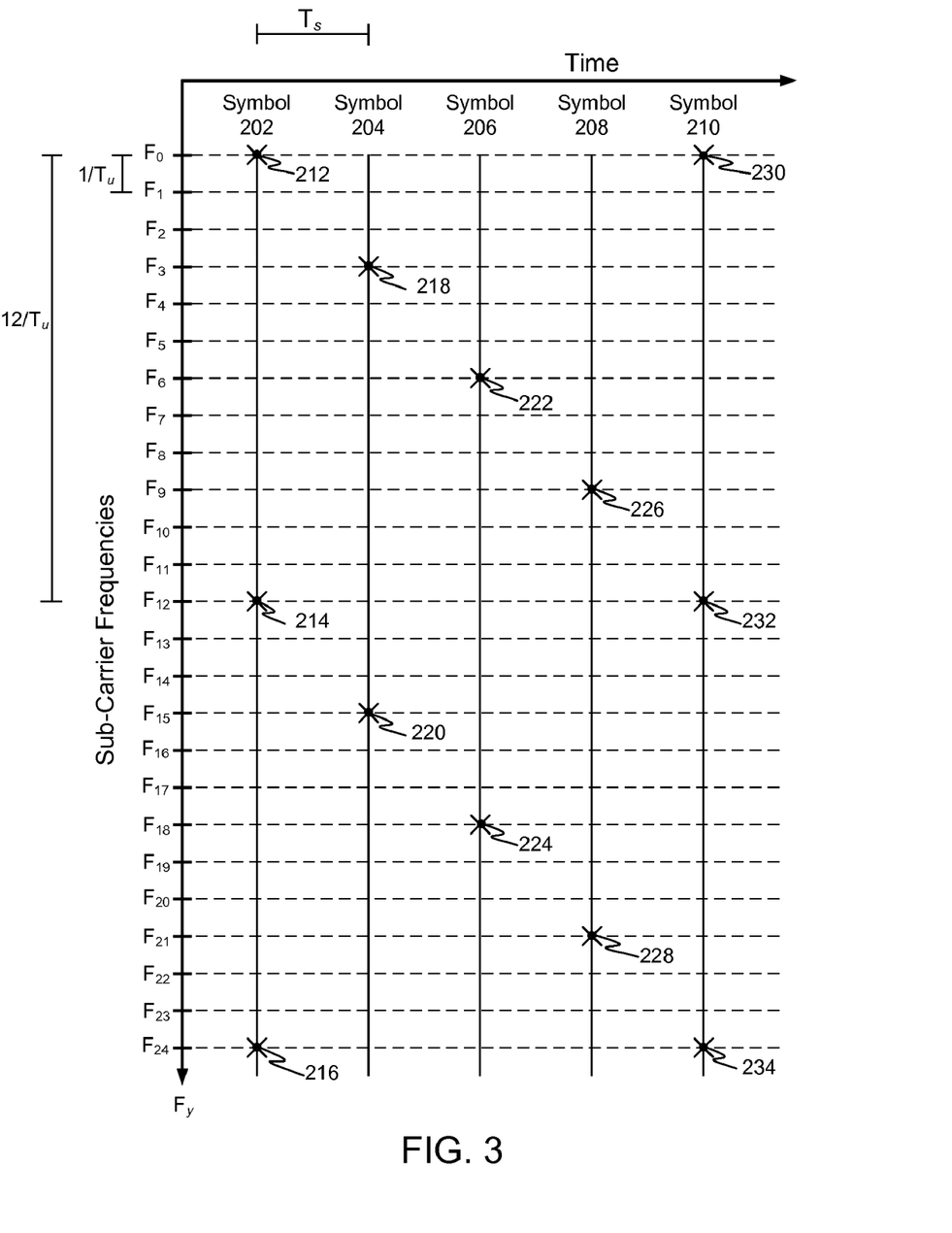
FIG. 3 is another graphic representation of the plurality of symbols of the OFDM signal, including symbols "X" to denote channel frequency responses corresponding to scattered pilots.

Returning to FIG. 1, at 104, channel frequency responses are determined or estimated for pilot frequencies, from the pilots. Where the pilot modulation scheme is known, the pilots may be used to determine or estimate channel frequency responses corresponding to the pilots. FIG. 3 is a graphic representation of symbols 202 through 210, including symbols "X" to denote channel frequency responses corresponding to pilots 212 through 234.

Figure 4:
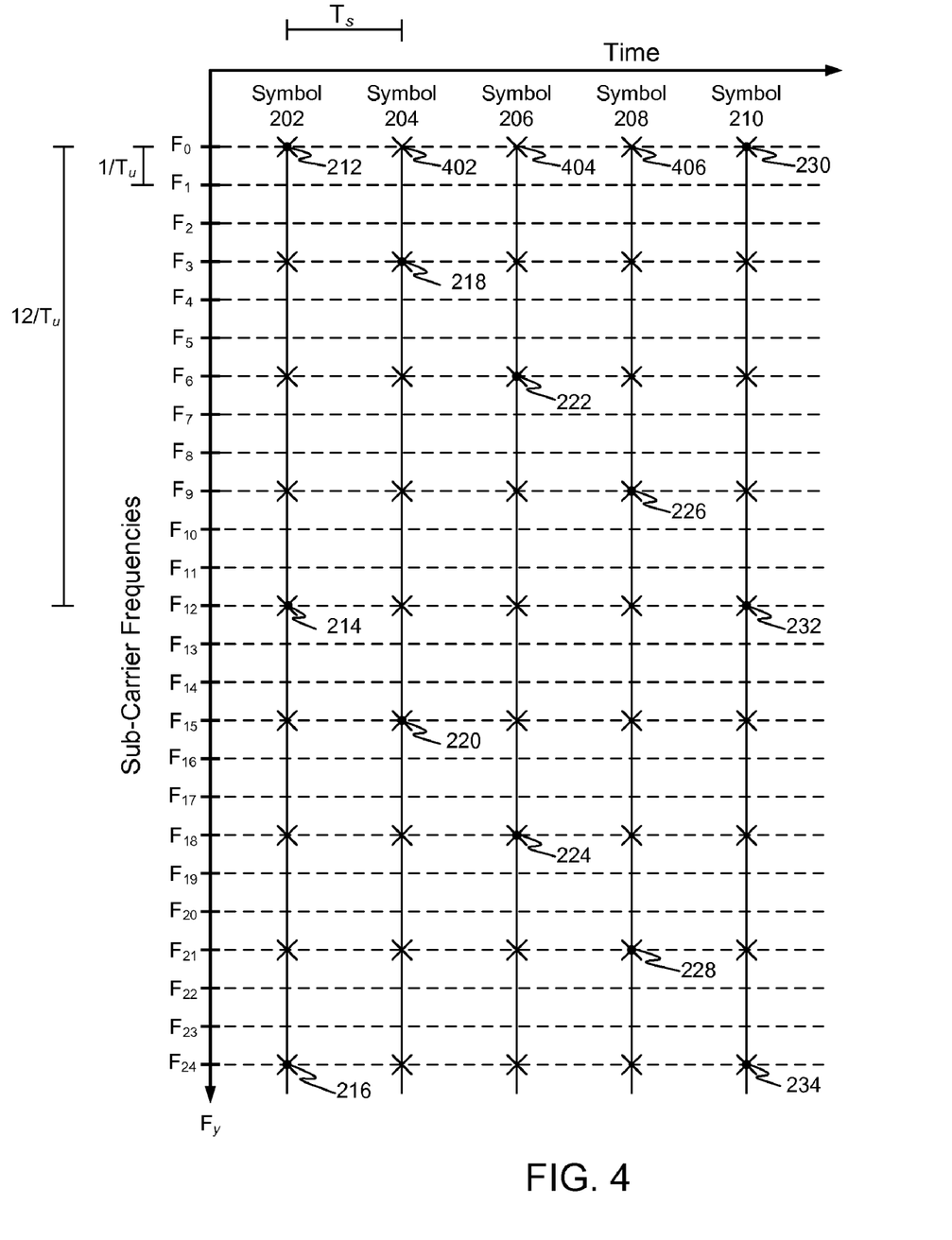
FIG. 4 is another graphic representation of the plurality of symbols of the OFDM signal, including additional symbols "X" to denote estimated channel frequency responses at scattered pilot frequencies determined by interpolation.

The channel frequency responses corresponding to the pilots, such as illustrated in FIG. 3, may be interpolated over multiple symbols in the time direction to determine or estimate channel frequency responses for non-pilot positions of the pilot frequencies, as illustrated in FIG. 4. FIG. 4 is a graphic representation of symbols 202 through 210, including additional symbols "X" to denote estimated channel frequency responses at pilot frequencies $F_0, F_3, F_6, F_9, F_{12}, F_{15}, F_{18}, F_{21}$, and $F_{24}$, determined by interpolation. For example, interpolating between pilots 212 and 230 of pilot frequency $F_0$, provides estimated channel frequency responses at 402, 404, and 406 of symbols 204, 206, and 208, respectively. In the example of FIG. 4, the interpolation is illustrated as a 1→4 interpolation.

The estimating of channel frequency responses at 104 in FIG. 1 may include low-pass filtering the estimated channel frequency responses over time. The filtering may include low-pass filtering the channel frequency responses corresponding to the pilot and the non-pilot positions of the symbols. For example, with respect to frequency $F_0$, the low-pass filtering may include filtering channel frequency responses 212, 402, 406, 408, and 230. The low-pass filtering may change initial values of pilot channel frequency responses at 212 and 230.

The combination of interpolating and low-pass filtering is referred to herein as time-filtering.

Pilots may include noise, which may degrade the signal-to-noise ratio (SNR) of a channel frequency response estimate. As described below with respect to 106, noise may be reduced by filtering or masking noise from the channel frequency response estimates in the time domain, which may be implemented relatively inexpensively in terms of memory and complexity. Time filtering at 104 may thus be performed with a relatively wide band filter, which may be suitable for both mobile and stationary or relatively stationary applications.

At 106, the estimated channel frequency responses corresponding to the pilot frequencies are band-pass filtered or masked in a time domain. The filtering or masking may include filtering or masking on a symbol-by-symbol basis, and may take advantage of a relatively sparse property of time domain representations of the channel frequency responses, described below with respect to FIG. 5.

Figure 5:
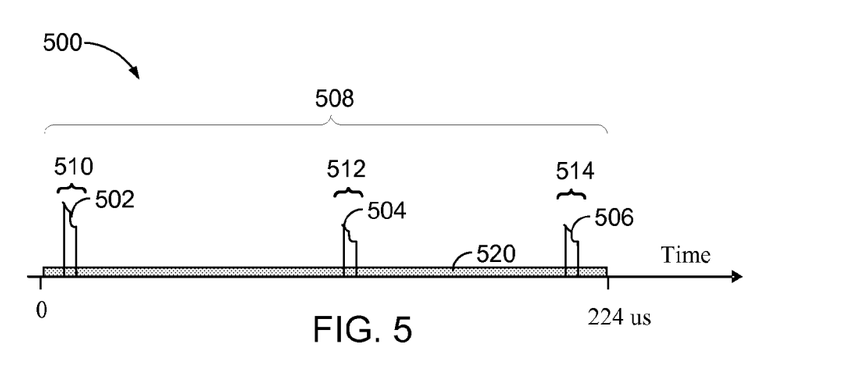
FIG. 5 is a graphic representation of an exemplary OFDM signal reception environment, including a plurality of signal clusters.

FIG. 5 is a graphic representation of an exemplary OFDM signal reception environment from a receiver perspective. In the example of FIG. 5, three signal clusters 502, 504, and 506, may correspond to three instances of an OFDM signal received from three corresponding transmitters. Signals from other, possibly more distant transmitters may be below an Average White Gaussian Noise, or noise floor 520. The exemplary signal reception environment of FIG. 5 may represent a channel impulse response relative to the receiver.

Transmitted signals may be dispersed by local reflections, which may result in delay spreads or dispersal regions, illustrated in FIG. 5 as delay spreads 510, 512, and 514. Delay spreads due to local reflections may be relatively small, and may be less than approximately 5 μs, which corresponds to a distance of approximately 1.5 kilometers (km).

The example of FIG. 5 may correspond to a DVB-T, 8 mega Hertz (MHz), 8K OFDM modulation scheme having a guard ratio of ¼ and a symbol period, $T_u$, of 896 microseconds (μs), for a guard interval of 224 μs. Transmitters of a corresponding SFN may be configured to substantially insure that multi-path effects within the guard interval. A receiver demodulator may be configured to compensate for echoes within a corresponding guard interval with little or substantially no inter-symbol interference.

Guard interval 508 may be relatively large compared to delay spreads 510, 512, and 514. For a multi-frequency network (MFN), a shorter guard interval may be implemented. For example, consider a 2K OFDM signal with a guard ratio of ¹⁄₃₂ and a guard interval of 7 μs. A mobile application may be configured with this in accordance with a 6-path Typical Urban (TU6) channel profile, and to accommodate delay spreads of approximately 6 μs.

Signal clusters 502, 504, and 506 may be spread relatively far from one another within guard interval 508, and spaces between signal clusters 502, 504, and 506 may be relatively sparse, even when additional signal clusters are present.

The noise filtering or masking at 106 may include masking relatively sparse portions of channel impulse responses, and may include adaptively masking relatively sparse portions of channel impulse responses. The masking may improve a signal-to-noise ratio (SNR) of the channel estimates generated at 104. The SNR gain may be a function of the sparseness guard interval, wherein greater sparseness may result in higher SNR gain.

Figure 6:
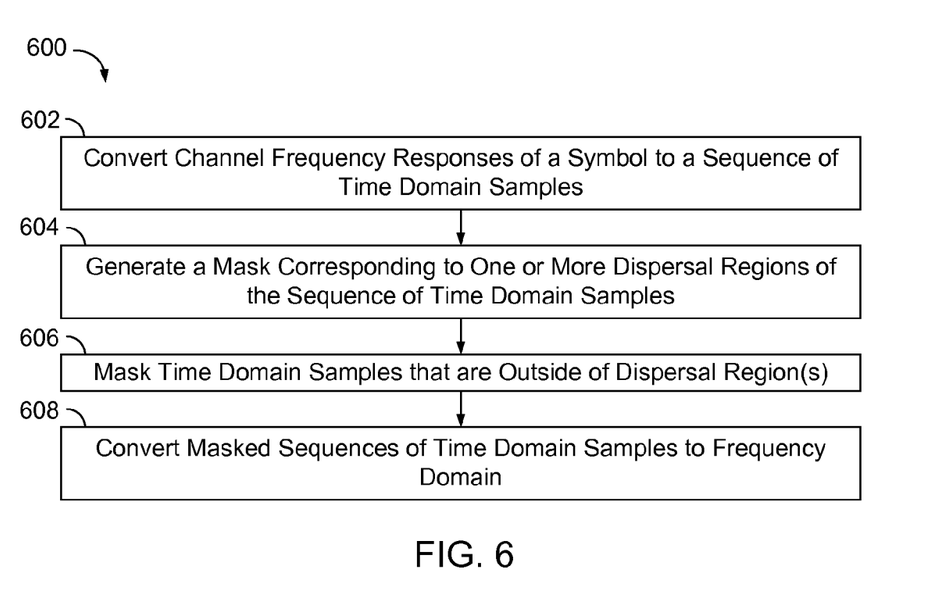
FIG. 6 is a process flowchart of an exemplary method of filtering or masking a time domain representation of an estimated channel frequency response.

FIG. 6 is a process flowchart of an exemplary method 600 of masking relatively sparse portions of channel impulse responses in a time domain.

At 602, channel frequency responses corresponding to a symbol of the OFDM signal are converted to a sequence of samples in the time domain. This may include performing an Inverse Fast Fourier transform (IFFT) on the channel frequency responses. The IFFT may be performed once per symbol, along a frequency axis in FIG. 4. A length of the IFFT may correspond to a number of channel frequency responses of the OFDM symbol determined at 104. In the example of FIG. 4, estimated channel frequency responses are available for the pilot frequencies, which correspond to every third carrier frequency. Where the OFDM signal includes, for example, 6817 carrier frequencies, which may correspond to a digital video broadcast standard DVB-T 8K OFDM, the number of pilot frequencies may be equal to 6817 divided by 3, or 2273. The IFFT may include a 4096-point IFFT to transform the channel frequency responses of a symbol into the time domain. Where pilot spacing is $3/T_u$, 4096 points in the time domain may correspond to a time duration of $T_u/3$.

The conversion to the time domain at 602 may represent a channel impulse response of the symbol, such as illustrated in FIG. 5.

At 604, a mask is generated corresponding to relatively significant parts of the channel impulse response, such as signal clusters or dispersal regions 502, 504, and 506 in FIG. 5.

Figure 7:
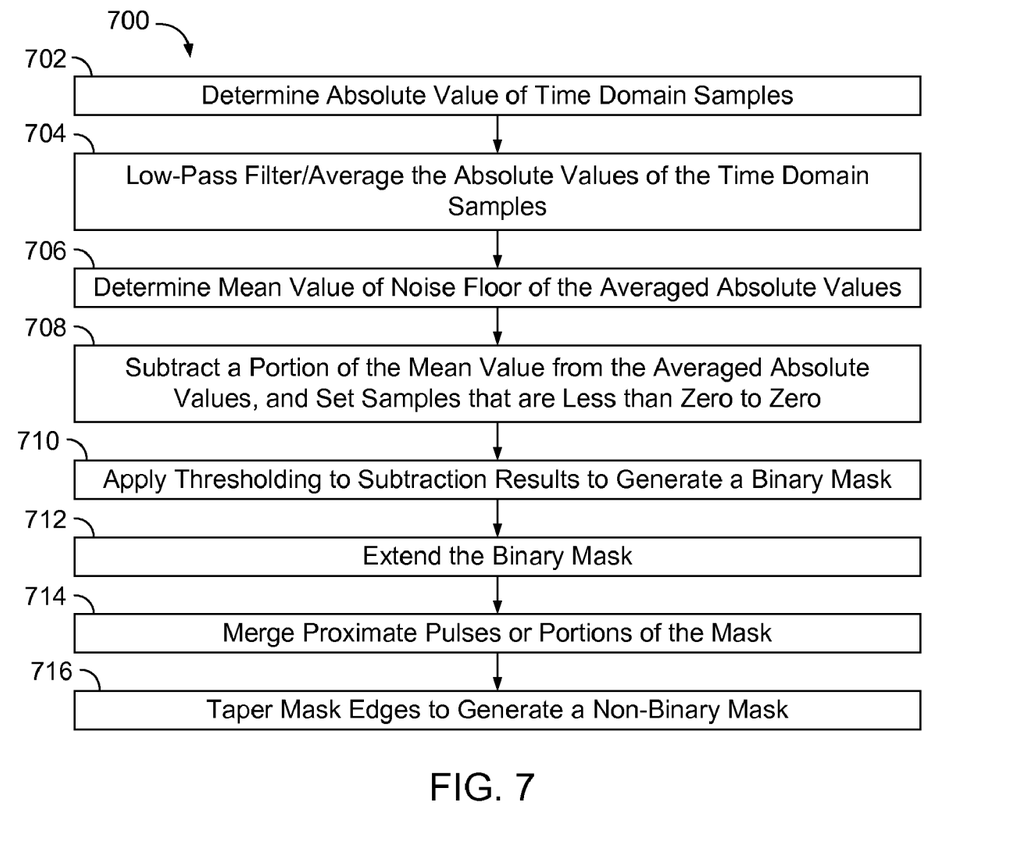
FIG. 7 is a process flowchart of an exemplary method of generating a mask.

FIG. 7 is a process flowchart of an exemplary method 700 of generating a mask.

At 702, absolute values or magnitudes of time domain samples are determined.

At 704, the magnitudes values are averaged or low-pass filtered. The averaging or the low pass filtering may be performed over a plurality of symbols, for each magnitude value, in symbol time direction. The averaging may reduce a noise floor of the time domain samples.

A threshold may be applied to the averaged magnitude values, which may reduce the noise floor. This may include setting averaged magnitude values that are below the threshold to zero. The threshold may be set to a fraction of a peak value of the time domain samples, or a fraction of a peak value of the averaged magnitudes. The threshold may be, for example, a factor of 32 less than the peak value. This may be substantially equivalent to setting echoes that are less than 30 dB of the peak value to zero. An exemplary method of reducing the noise floor using thresholding is described below with respect to 706 through 710 of FIG. 7.

At 706, a mean value of the noise floor is determined. This may include determining the mean value of all or substantially all averaged magnitude values that are less than a fraction, such as ⅛ of the peak value.

At 708, a portion of the mean value of the noise floor is subtracted from the averaged magnitude values. Resultant values that are less than zero may be set to zero.

At 710, thresholding is applied to the results of the subtraction at 708. A threshold factor may be a fraction of the peak value, such as ¹⁄₃₂. Results that are less than the threshold value may be set to zero. Results above the threshold value may be set to a non-zero value. Where, as in the example above, the IFFT is a 4096-point IFFT, samples above the threshold value may be set to 1024, which results in a binary mask having values of 0 and 1024.

Figure 8:
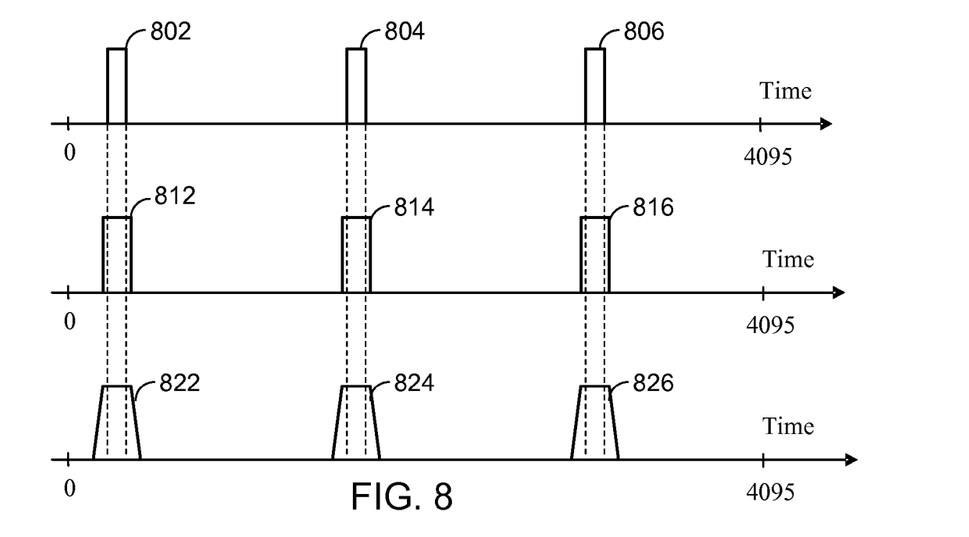
FIG. 8 is a graphic representation of exemplary masks.

FIG. 8 is a graphic representation of exemplary binary mask portions 802, 804, and 806, corresponding to signal clusters 502, 504, and 506 in FIG. 5.

At 712, mask edges may be extended in time, illustrated in FIG. 8 with binary mask portions 812, 814, and 816. Mask edges may be extended a relatively small amount of time.

At 714, mask portions or pulses that fall relatively close to one another may be merged.

At 716, edges of the binary mask may be tapered, to generate a non-binary mask, illustrated in FIG. 8 with tapered mask portions 822, 824, and 826. Tapering may reduce the length of the impulse response of the band-pass filtering or masking. Edges may be tapered substantially linearly, as illustrated in FIG. 8, or non-linearly.

Returning to FIG. 6, at 606, the mask is applied to the sequence of time domain samples.

Figure 9:
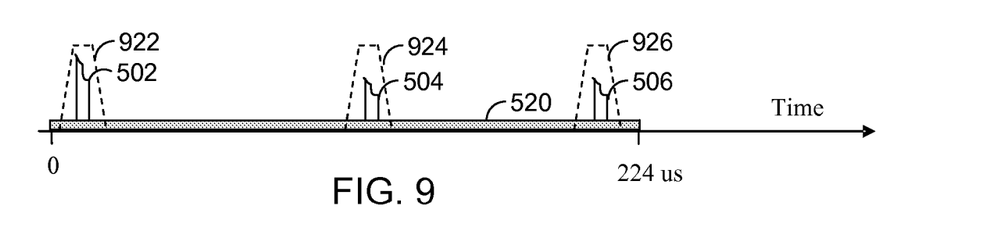
FIG. 9 is a graphic representation of exemplary mask portions corresponding to the signal clusters of FIG. 5.

FIG. 9 is a graphic representation of an exemplary mask, including mask portions 922, 924, and 926, corresponding to signal clusters 502, 504, and 506, respectively. The mask may be multiplied by the sequence of time domain samples, referred to herein as point-wise multiplication. The masking may remove content, including noise, that falls outside of the mask or mask portions. This may improve a SNR of the channel frequency response estimates.

Figure 10:
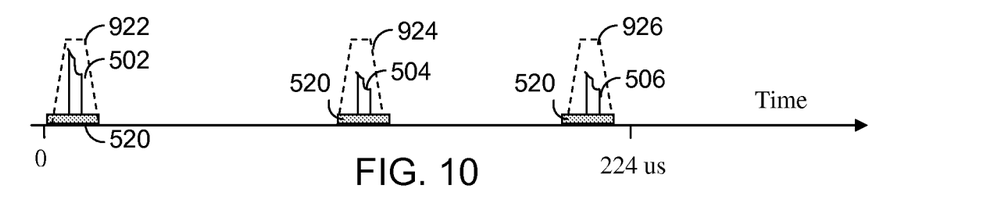
FIG. 10 is another graphic representation of the exemplary mask portions of FIG. 9, wherein portions of a noise floor between the mask portions have been filtered or masked.

FIG. 10 is a graphic representation of the sequence of time domain samples of FIG. 5, wherein portions of noise floor 520 between mask portions 922, 924, and 926, have been band-pass filtered or masked.

At 608, the masked sequence of time domain samples is converted to the frequency domain. This may include performing a Fast Fourier Transform (FFT) on the masked sequence of time domain samples, for each symbol, along the frequency axis of FIG. 4. The frequency domain representation of the masked sequence of time domain samples is referred to herein as a band-pass filtered or masked channel frequency response estimate of the symbol.

Method 600 or portions thereof may be repeated successively for additional symbols or symbol periods, and a mask may be generated and/or updated each symbol period. Such a masking process is referred to herein as a self-adapting masking process, which may track variations of a channel impulse response over time, which may occur, for example, in mobile applications.

The time domain filtering or masking at 106 may serve as band-pass filtering, and may remove a relatively significant amount of noise in the channel frequency response. As a result, time filtering at 104 may be performed with a relatively wideband filter, which does not require as much memory or hardware complexity as a narrow band filter, and which may improve Doppler recovery in mobile applications. An implementation may thus be suitable for both stationary and mobile applications.

Returning to FIG. 1, at 108, the band-pass filtered or masked channel frequency response estimate corresponding to a symbol, is frequency interpolated to obtain channel frequency response estimates for remaining carrier frequencies, or non-pilot frequencies of the symbol. In the example of FIG. 4, where channel frequency responses corresponding to pilot frequencies are known or estimated for every third frequency, the frequency interpolation may include 1→3 frequency interpolating.

The frequency interpolation may be performed with a relatively wideband filter to capture an entire or substantial portion of a channel multi-path profile. For example, in single frequency networks, echoes or multi-paths may be relatively very far apart, and an interpolator frequency response may be relatively long, and/or as long as practical to capture an entire or substantial portion of the multi-path delay spread. In the example of FIG. 4, a time period may be approximately $-T_u/6$ to $T_u/6$. The frequency interpolation provides channel estimates at non-pilot frequencies, as illustrated in FIG. 11.

Figure 11:
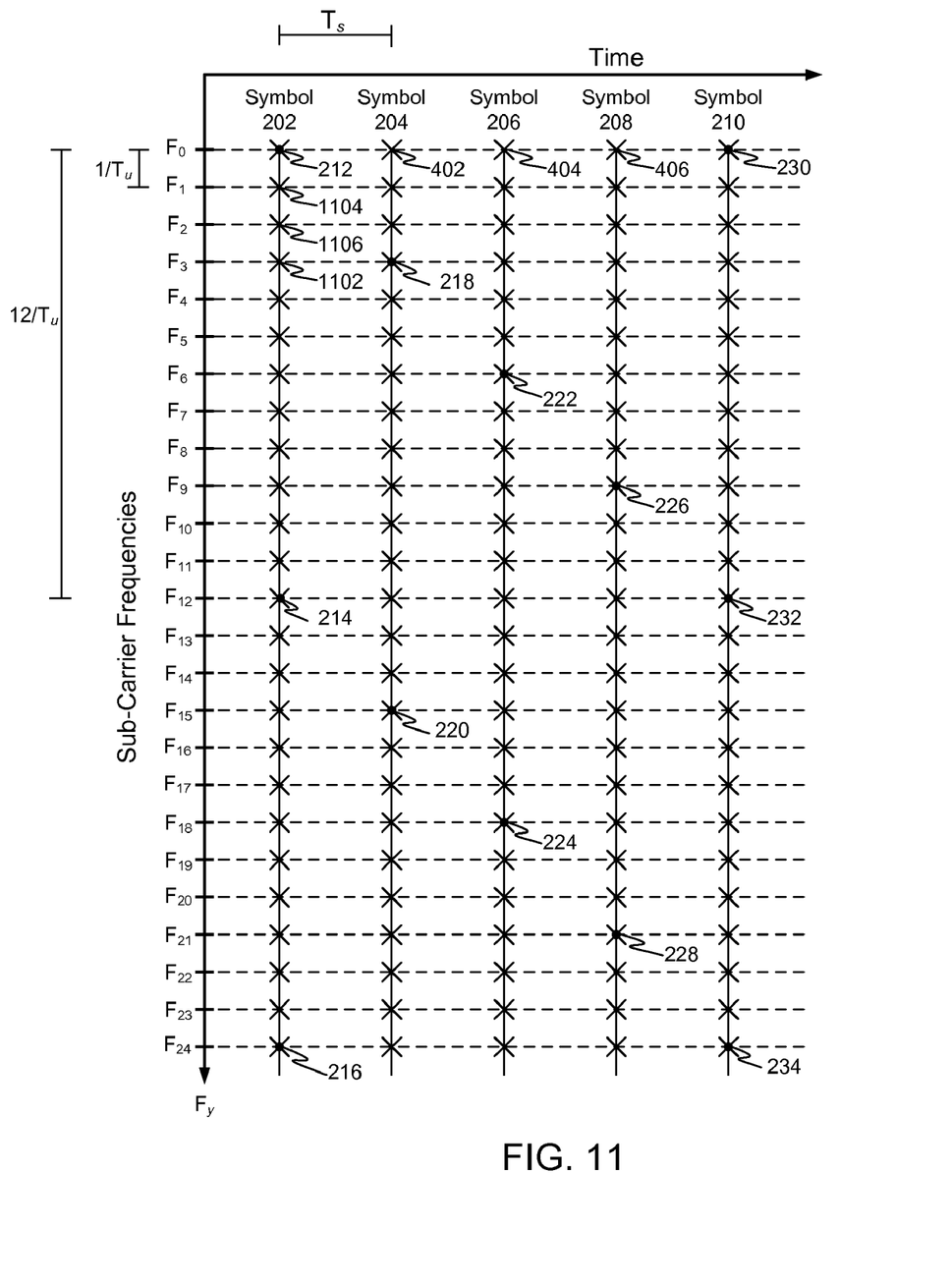
FIG. 11 is another graphic representation of the plurality of symbols of the OFDM signal, including additional symbols "X" to denote estimated channel frequency responses at non-pilot frequencies determined by frequency interpolation.

FIG. 11 is a graphic representation of symbols 202 through 210, including additional symbols "X" to denote estimated channel frequency responses at non-pilot frequencies $F_1$, $F_2$, $F_4$, $F_5$, $F_7$, $F_8$, $F_{10}$, $F_{11}$, $F_{13}$, $F_{14}$, $F_{16}$, $F_{17}$, $F_{19}$, $F_{20}$, $F_{22}$, and $F_{23}$, determined by frequency interpolation. For example, with respect to symbol 202, interpolating between the channel frequency response at 212 of frequency $F_0$ and a channel frequency response at 1102 of frequency $F_3$, provides channel frequency response at 1104 and 1106 of frequencies $F_1$ and $F_2$, respectively.

Where the time domain noise filtering or masking at 606 includes point-wise multiplication of the IFFT sequence, the multiplication may be viewed as cyclic convolution in channel frequency response domain.

The cyclic convolution may result in changes to edges of the channel frequency responses. Such changes may include corruption of edge carriers, such as carriers that fall near edges of the frequency responses at 212, 402, 404, 406, and 230 in FIG. 4.

The number of affected edge carriers may be a function of the tapering, or the amount of tapering introduced to the mask at 716 in FIG. 7. The number of affected edge carriers may be determined by the Fourier inverse of the smallest pulse within an IFFT sequence.

Affected edge carriers may be restored or replaced with original carriers after the filtered symbols are converted to the frequency domain at 608 in FIG. 6. Since restored edge carriers have not been noise-filtered, it may be desirable to minimize the number of edge carriers to be restored. The number of edge carriers to be restored may be minimized by broadening the tapering at 716 in FIG. 7. Since this may result in more noise passing through the band-pass filtering at 106 in FIG. 1, tapering at 716 may include optimizing the amount tapering to minimize edge carrier corruption and noise.

A channel frequency response determined or estimated as disclosed herein may be used for one or more subsequent operations including, without limitation, equalization, symbol timing recovery, such as positioning of an FFT window for transforming a received time domain signal to the frequency domain, and inter-carrier-interference (ICI) cancellation. ICI cancellation may be performed with respect to a derivative of the channel frequency response with respect to time. Noise filtering or masking in a time domain, as disclosed herein, may improve a signal-to-noise ratio (SNR) of a channel frequency response estimate, which may improve a SNR of data carriers obtained through equalization, ICI cancellation, and an overall SNR performance of a demodulator.

Methods of determining channel frequency responses, and portions thereof, including methods of masking noise in a time domain, may be implemented as part of a signal receiver system, and may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 12:
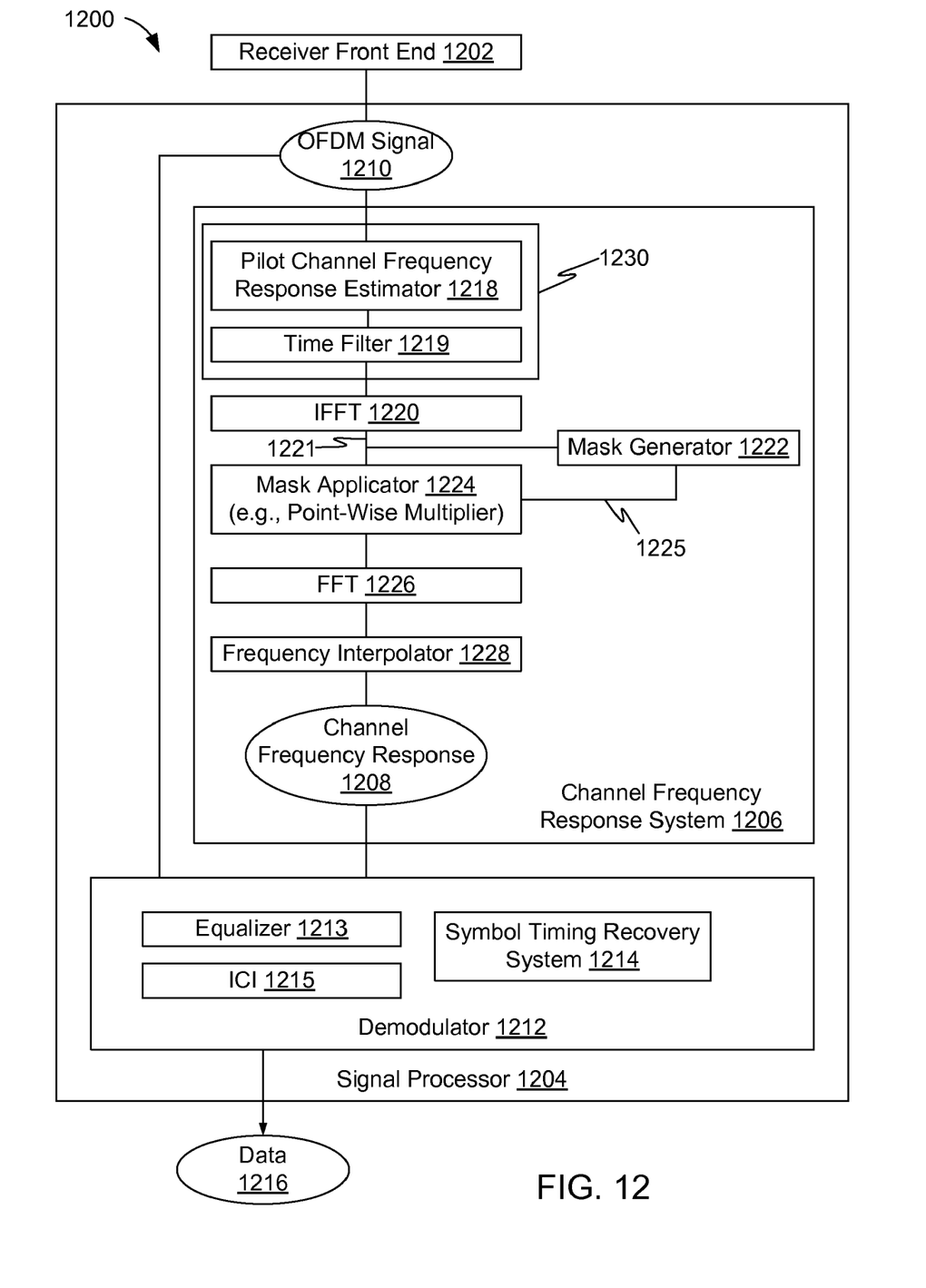
FIG. 12 is a block diagram of an exemplary receiver system, including a channel frequency response system to determine a channel frequency response corresponding to an OFDM signal.

FIG. 12 is a block diagram of an exemplary receiver system 1200, including a receiver front end 1202 and a signal processor 1204.

Signal processor 1204 includes a channel frequency response system 1206 to determine or estimate a channel frequency response 1208 corresponding to an OFDM signal 1210.

Signal processor 1204 may include one or more of a demodulator 1212, an equalizer 1213, a symbol timing recovery system 1214, and an inter-carrier cancellation (ICC) system 1214, to process OFDM signal 1210 in response to channel frequency response 1208, and to output demodulated data 1216.

Channel frequency response system 1206 may include a pilot channel frequency estimator 1218 to determine channel frequency responses corresponding to pilots of OFDM signal 1210, as described above with respect to 104 in FIG. 1 and as illustrated in FIG. 3.

Channel frequency response system 1206 may include a time filter 1219 to interpolate and low-pass filter the channel frequency responses corresponding to the pilots, as described above with respect to 104 in FIG. 1 and as illustrated in FIG. 4.

Pilot channel frequency estimator 1218 and time filter 1219, together, determine channel frequency responses corresponding to scattered pilot frequencies, and may be referred to together as a scattered pilot frequency, channel frequency response system 1230.

Channel frequency response system 1206 may include an Inverse Fast Fourier Transform (IFFT) system 1220 to convert channel frequency responses of pilot frequencies to a sequence of time domain samples 1221, as described above with respect to 602 in FIG. 6.

Channel frequency response system 1206 may include a mask generator 1222 to generate and/or update a mask 1225 corresponding to dispersal regions of time domain samples 1221, as described above with respect to 604 in FIG. 6.

Channel frequency response system 1206 may include a mask applicator 1224 to mask portions of sequences of time domain samples that are outside of one or more portions of corresponding masks 1225, as described above with respect to 606 in FIG. 6.

Channel frequency response system 1206 may include a Fast Fourier Transform (FFT) system 1226 to convert a masked sequence of time domain symbols to the frequency domain, as described above with respect to 608 in FIG. 6.

Channel frequency response system 1206 may include a frequency interpolator 1228 to frequency interpolate the frequency domain representation of the masked sequence of time domain symbols, or band-pass filtered channel frequency responses, as described above with respect to 108 in FIG. 1.

Figure 13:
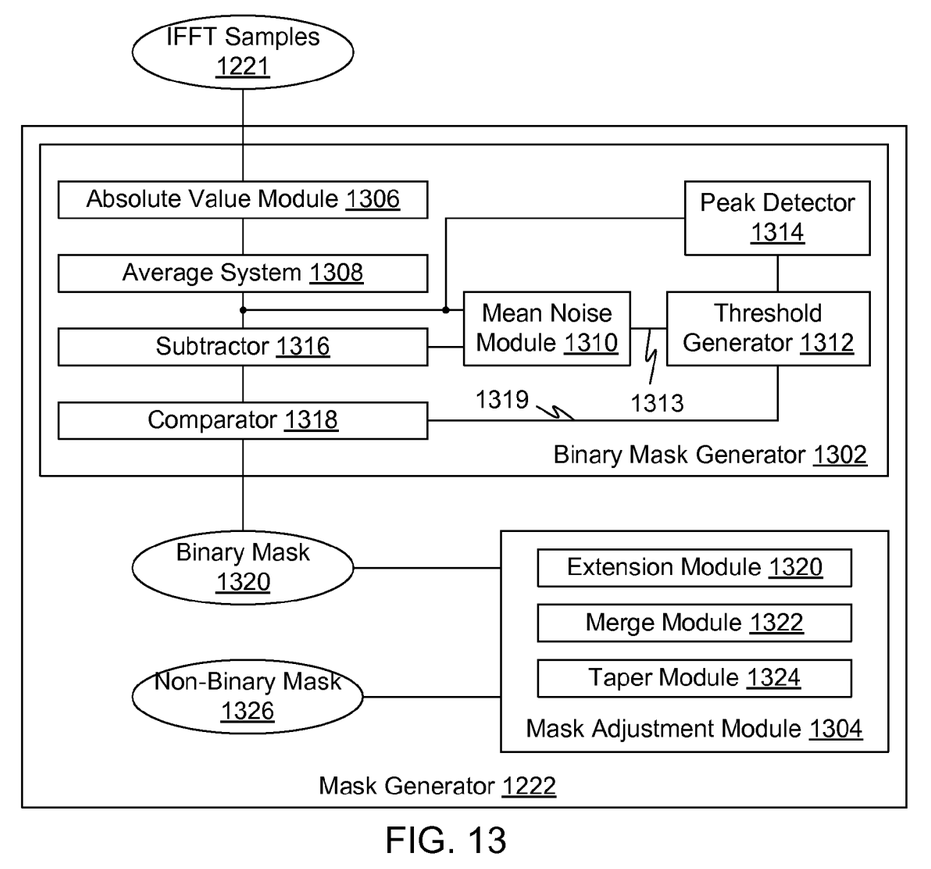
FIG. 13 is an exemplary block diagram of a mask generator including a binary mask generator and a mask adjustment module.

FIG. 13 is an exemplary block diagram of mask generator 1222, including a binary mask generator 1302 and a mask adjustment module 1304.

Binary mask generator 1302 may include an absolute value module 1306 to determine absolute values or magnitudes of the time domain samples of a symbol, as described above with respect to 702 in FIG. 7.

Binary mask generator 1302 may include an average system 1308 to average or low-pass filter the magnitude values, as described above with respect to 704 in FIG. 7.

Binary mask generator 1302 may include a mean noise module 1310 to determine a noise floor of the averaged magnitude values, as described above with respect to 706 in FIG. 7.

Mean noise module 1310 may be configured to determine a mean value of the averaged magnitude values that are below a threshold 1313, and binary mask generator 1302 may a threshold generator 1312 to determine threshold 1313 relative to the time domain samples. Binary mask generator 1302 may include a peak value detector 1314 to determine a peak value of the time domain samples of the symbol, or a peak value of the averaged magnitude values, and threshold generator 1312 may be configured to determine threshold 1313 relative to the peak value.

Binary mask generator 1302 may include a subtractor 1316 to subtract a portion of the mean value from the averaged magnitude values, as described above with respect to 708 in FIG. 7.

Binary mask generator 1302 may include a comparator 1318 to set results from subtractor 1316 that are below a second threshold 1319 to zero, to set results from subtractor 1316 that are above second threshold 1319 to a non-zero value, and to output the corresponding zero and non-zero values as a binary mask 1320, as described above with respect to 710 in FIG. 7.

Mask adjustment module 1304 may include an extension module 1320 to extend binary mask 1320 in the time domain, as described above with respect to 712 in FIG. 7.

Mask adjustment module 1304 may include a merge module 1322 to merge portions or pulses of a mask that are proximate to one another, as described above with respect to 714 in FIG. 7.

Mask adjustment module 1304 may include a taper module 1324 to taper edges of binary mask 1320 and to output a non-binary mask 1326 as mask 1225 in FIG. 12, as described above with respect to 716 in FIG. 7.

Figure 14:
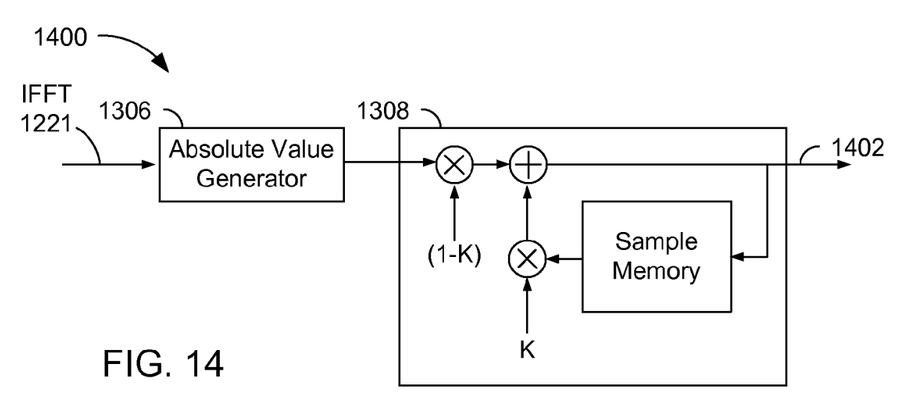
FIG. 14 is a block diagram of an exemplary recursive average system to average a sequence of time domain samples of an estimated channel frequency response corresponding to a symbol of an OFDM signal.

FIG. 14 is a block diagram of an exemplary recursive average system 1400 to average multiple successive IFFT samples 1221. System 1400 may include absolute value generator 1306 and average system 1308 in FIG. 13. In the example of FIG. 14, average system 1308 is illustrated as a single-pole recursive filter having a time constant K, which may be a fraction, such as $\frac{1}{16}$. For relatively stationary applications, smaller values may be used for K. Where IFFT system 1220 in FIG. 12 is a 4096-point IFFT, an output 1402 of single-pole recursive filter 1308 may be a 4096-point real-values sequence.

Methods and systems disclosed herein may be implemented in conjunction with one or more of stationary, portable, and mobile applications, including, without limitation, a 6-path Typical Urban channel profile. The value of K may be higher for mobile applications, which may enable faster tracking of channel variations with time.

Methods and systems disclosed herein may be implemented in conjunction with one or more OFDM-based digital TV standards including, without limitation, DVB-T, DVB-H, and ISDB-T standards, and a pending DVB-T2 standard.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

What is claimed is:

1. A method, comprising:
   determining channel frequency responses corresponding to scattered pilot frequencies of a plurality of symbols of an orthogonal frequency division multiplex (OFDM) signal;
   converting the channel frequency responses to a sequence of time domain samples;
   band-pass filtering in the time domain by masking portions of the sequence of time domain samples that are outside of one or more dispersal regions of the time domain samples;
   converting the masked sequence of time domain samples to a frequency domain; and
   frequency interpolating the frequency domain representation of the masked sequence of time domain samples to generate channel frequency responses at non-scattered pilot frequencies of the symbols,
   wherein the masking includes:
   identifying one or more dispersal regions of the time domain samples;
   generating a mask corresponding to the one or more dispersal regions; and
   multiplying the sequence of time domain samples by the mask.

2. The method of claim 1, further including:
   repeating the converting the channel frequency responses, the band-pass filtering in the time domain by masking, the converting the masked sequence of time domain samples, and the frequency interpolating, for additional symbols of the OFDM signal;
   wherein the masking includes adapting the mask to the additional symbols.

3. The method of claim 1, wherein the generating a mask includes:
   determining an average noise value of the time domain samples;
   subtracting a portion of the average noise value from the time domain samples; and
   generating the mask corresponding to time domain samples having a subtracting result above a threshold.

4. The method of claim 3, further including:
   determining the threshold relative to a peak value of the sequence of time domain samples.

5. The method of claim 1, wherein the generating a mask includes:
   determining magnitude values of the sequence of time domain samples;
   averaging the magnitude values over a plurality of OFDM symbols in a symbol time direction;
   determining a mean value of averaged magnitude values that are below a first threshold;
   subtracting a portion of the mean value from the averaged magnitude values;
   setting averaged magnitude values having a subtracting result less than a second threshold to zero; and
   setting averaged magnitude values having a subtracting result greater than the second threshold to a non-zero value.

6. The method of claim 5, further including:
   determining the first and second thresholds relative to a peak value of the averaged magnitude values.

7. The method of claim 1, wherein the generating a mask includes:
   generating a binary mask corresponding to the dispersal regions; and
   extending the binary mask in time.

8. The method of claim 7, wherein the generating the mask further includes:
   merging portions of the mask that are proximate to one another.

9. The method of claim 7, wherein the generating a mask further includes:
   generating a non-binary mask from the binary mask.

10. The method of claim 9, wherein the generating the non-binary mask includes:
    tapering edges of the mask.

11. The method of claim 10, wherein the tapering of the edges of the mask includes:
    linearly tapering the edges of the mask.

12. The method of claim 1, further including:
    restoring one or more edge carriers of a corresponding OFDM channel frequency response subsequent to the converting the masked sequence of time domain samples, and prior to the frequency interpolating.

13. A system, comprising:
    a scattered pilot frequency channel frequency response system to determine channel frequency responses corresponding to scattered pilot frequencies of a plurality of symbols of an orthogonal frequency division multiplex (OFDM) signal;
    an Inverse Fast Fourier Transform system to convert the channel frequency responses to a sequence of time domain samples, for each of the plurality of symbols, to produce sequences of time domain samples;
    a mask system to mask, and thereby band-pass filter in the time domain, one or more portions of the sequences of time domain samples that are outside of one or more dispersal regions of the corresponding sequence of time domain samples;
    a Fast Fourier Transform system to convert masked sequences of the time domain samples to a frequency domain; and
    a frequency interpolator to interpolate channel frequency responses of non-scattered pilot frequencies of the symbols from corresponding frequency domain representations of the sequences of the time domain samples,
    wherein the mask system includes:
    a mask generator to generate a mask corresponding to the one or more dispersal regions, for each of the sequences of time domain samples; and a mask applicator to multiply the sequences of time domain samples by corresponding points of the mask.

14. The system according to claim 13, wherein the mask generator includes a binary mask generator, the binary mask generator including:
- a magnitude calculator to determine magnitude values of the sequences of time domain samples;
- a recursive average system to recursively average the magnitude values;
- a mean noise module to determine a mean value of averaged magnitude values that are below a first threshold;
- a subtractor to subtract a portion of the mean value from the averaged magnitude values; and
- a comparator to set averaged magnitude values having a subtraction result less than a second threshold to zero, and to set averaged magnitude values having a subtraction result greater than the second threshold to a non-zero value.

15. The system according to claim 13, wherein the mask generator includes a binary mask generator and a mask adjustor, wherein the mask adjustor includes one or more of:
- an extension module to extend binary masks in time;
- a merge module to merge non-zero portions of a mask that are proximate to one another; and
- a taper module to taper edges of the masks.

16. A system, comprising:
- a receiver front-end to receive and frequency down-convert an orthogonal frequency division multiplex (OFDM) signal; and
- a signal processor coupled to the receiver front-end, the signal processor including a channel frequency response system and one or more of a channel equalizer and an inter-carrier-interference cancellation module coupled to an output of the channel frequency response system, the channel frequency response system including,
  - a scattered pilot frequency channel frequency response system to determine channel frequency responses corresponding to scattered pilot frequencies of a plurality of symbols of an OFDM signal,
  - an Inverse Fast Fourier Transform system to convert the channel frequency responses to a sequence of time domain samples, for each of the plurality of symbols to produce sequences of time domain samples,
  - a mask system to mask, and thereby band-pass filter in the time domain, one or more portions of the sequences of time domain samples that are outside of one or more dispersal regions of the corresponding sequence of time domain samples,
  - a Fast Fourier Transform system to convert masked sequences of the time domain samples to a frequency domain, and
  - a frequency interpolator to interpolate channel frequency responses of non-scattered pilot frequencies of the symbols from corresponding frequency domain representations of the sequences of the time domain samples,
  wherein the mask system includes:
  - a mask generator to generate a mask corresponding to the one or more dispersal regions, for each of the sequences of time domain samples; and a mask applicator to multiply the sequences of time domain samples by the corresponding masks.

17. The generator of claim 16, wherein the mask system includes:
- a magnitude calculator to determine magnitude values of the sequences of time domain samples,
- a recursive average system to recursively average the magnitude values,
- a mean noise module to determine a mean value of averaged magnitude values that are below a first threshold,
- a subtractor to subtract a portion of the mean value from the averaged magnitude values, and
- a comparator to set averaged magnitude values having a subtraction result less than a second threshold to zero, and to set averaged magnitude values having a subtraction result greater than the second threshold to a non-zero value.

18. The system according to claim 16, wherein the mask system includes a binary mask generator and a mask adjustor, and wherein the mask adjustor includes one or more of:
- an extension module to extend binary masks in time;
- a merge module to merge portions of a mask that are proximate to one another; and
- a taper module to taper edges of the masks.

* * * * *